(12) United States Patent
Shim et al.

(10) Patent No.: US 7,921,231 B2
(45) Date of Patent: Apr. 5, 2011

(54) DISCOVERY OF ELECTRONIC DEVICES UTILIZING A CONTROL BUS

(75) Inventors: Daeyun Shim, Saratoga, CA (US); Shrikant Ranade, Campbell, CA (US); Ravi Sharma, Cupertino, CA (US); Gyudong Kim, Sunnyvale, CA (US)

(73) Assignee: Silicon Image, Inc., Sunnyvale, CA (US)

( * ) Notice: Subject to any disclaimer, the term of this patent is extended or adjusted under 35 U.S.C. 154(b) by 162 days.

(21) Appl. No.: 11/969,865

(22) Filed: Jan. 4, 2008

(65) Prior Publication Data

US 2009/0177818 A1    Jul. 9, 2009

(51) Int. Cl.
G06F 3/00     (2006.01)
G06F 13/00    (2006.01)
G06F 13/28    (2006.01)
G06F 5/00     (2006.01)
G06F 13/20    (2006.01)

(52) U.S. Cl. ............ 710/14; 710/107; 710/313; 710/28; 710/36

(58) Field of Classification Search .................... 710/14, 710/107, 313, 28, 36
See application file for complete search history.

(56) References Cited

U.S. PATENT DOCUMENTS

| 5,210,846 | A | 5/1993 | Lee |
| 5,239,732 | A | 8/1993 | Steven |
| 5,579,299 | A | 11/1996 | Halter et al. |
| 5,729,547 | A | 3/1998 | Dute |
| 6,112,275 | A | 8/2000 | Curry et al. |
| 6,532,506 | B1 | 3/2003 | Dunstan et al. |
| 6,697,897 | B1 | 2/2004 | Friel et al. |
| 7,181,557 | B1 | 2/2007 | Falik et al. |
| 7,187,307 | B1 | 3/2007 | Schmidt et al. |
| 2004/0015570 | A1 | 1/2004 | Daum et al. |
| 2004/0218599 | A1 | 11/2004 | Kobayashi |
| 2005/0185720 | A1 | 8/2005 | Kwok |
| 2007/0073449 | A1 | 3/2007 | Kraemer et al. |
| 2007/0083692 | A1* | 4/2007 | Liu et al. .................. 710/304 |
| 2007/0201492 | A1 | 8/2007 | Kobayashi |
| 2007/0279408 | A1 | 12/2007 | Zheng et al. |

(Continued)

FOREIGN PATENT DOCUMENTS

EP    1473701    11/2004

(Continued)

OTHER PUBLICATIONS

"On-The-Go Supplement to the USB 2.0 Specification" Rev. 1.0, Dec. 18, 2001.*

(Continued)

*Primary Examiner* — Alford W Kindred
*Assistant Examiner* — Farley J Abad
(74) *Attorney, Agent, or Firm* — Blakely Sokoloff Taylor & Zafman

(57) ABSTRACT

Discovery of electronic devices utilizing a control bus. An embodiment of a method includes connecting a receiving device to a cable, where the cable includes a control bus. If the receiving device is in a disconnect state and a signal from a transmitting device is detected on the control bus, the device is transferred to a state for a first type of transmitting device. If the receiving device is in either the disconnect state or the state for the first type of transmitting device and a predetermined voltage signal is received from the transmitting device, then the receiving device is transferred to a state for a second type of transmitting device.

21 Claims, 11 Drawing Sheets

U.S. PATENT DOCUMENTS

2007/0286246 A1 12/2007 Kobayashi
2008/0315943 A1 12/2008 Underhill
2009/0177818 A1 7/2009 Shim et al.

FOREIGN PATENT DOCUMENTS

EP 1519581 3/2005
GB 2425696 11/2006

OTHER PUBLICATIONS

"High-Definition Multimedia Interface Specification Version 1.3a", Nov. 10, 2006.*

"8029P039PCT ISR and WO Mailed Mar. 13, 2009 for PCT/US2008/086879", (Mar. 13, 2009), Whole Document.

USPTO, Notice of Allowance for U.S. Appl. No. 11/969,852 mailed Apr. 8, 2010.

International Bureau, International Preliminary Report on Patentability for International Application No. PCT/US2008/086879 mailed Jul. 15, 2010.

International Bureau, International Preliminary Report on Patentability for International Application No. PCT/US2008/085288 mailed Jul. 15, 2010.

International Bureau, International Preliminary Report on Patentability for International Application No. PCT/US2008/085287 mailed Jul. 15, 2010.

International Searching Authority, International Search Report and Written Opinion for International Application No. PCT/US2008/85288 mailed Mar. 9, 2009, Whole Document.

USPTO, Non-Final Office Action for U.S. Appl. No. 11/969,852 mailed Sep. 25, 2009.

"1-Wire Extended Network Standard", MAXIM, Application Note 3925, Oct. 26, 2006, pp. 1-5, www.maxim-ic.com/an3925.

"1-Wire Products Design Guide", MAXIM, 4th Edition, Feb. 2009, pp. 1-8, www.maxim-ic.com/yes.

"4Kb Plus Time Memory iButton", Dallas Semiconductor/MAXIM, DS1994, Nov. 2009, pp. 1-23 www.maxim-ic-com.

PCT ISR WO Mailed Mar. 25, 2009 for PCT/US2008/085287, Whole Document.

"Advanced 1-Wire Network Driver", Application Note 244, Maxim Integrated Products, May 30, 2003, pp. 1-13.

"EconoRAM Time Chip", Dallas Semiconductor, DS2404, Jan. 22, 2007, pp. 1-29 www.maxim-ic.com.

"Guidelines for Reliable 1-Wire Networks", Application Note 148, Dallas Semiconductor/Maxim, Jun. 19, 2002, pp. 1-21.

High-Definition Multimedia Interface Specification Version 1.3, Internet Citation XP002391813—http://www.hdmi.org/download/HDMI_Spec_1.3_GMI.pdf, (retrieved on Jul. 26, 2006), Whole Document.

"Lindy Announce Mini HDMI Adapter for Camcorders and Notebooks", HDTV UK., Online Sep. 28, 2007, Retrieved from Internet Sep. 23, 2009 <http://www.hdtvuk.tv/2007/09/lindy_announce_1.html>.

Hitachi, Ltd., et al., "High-Definition Multimedia Interface: Specification Version 1.3", HDMI Licensing, LLC, Jun. 22, 2006, pp. 1-237.

Linke, Bernhard, "Choosing the Right 1-Wire Master for Embedded Applications", MAXIM, Application Note 4206, May 27, 2008, pp. 1-10 www.maximic.com/an4206.

Linke, Bernhard, "Overview of 1-Wire Technology and Its Use", MAXIM, Application Note 1796, Jun. 19, 2008, pp. 1-11 www.maxim-ic.com/an1796.

O'Donnell, B., "White Paper HDMITM: the Digital Display Link", IDC Analyze the Future, Framingham, MA, Dec. 2006, pp. 1-21.

Notice of Allowance for U.S. Appl. No. 11/969,852 mailed Aug. 13, 2010.

* cited by examiner

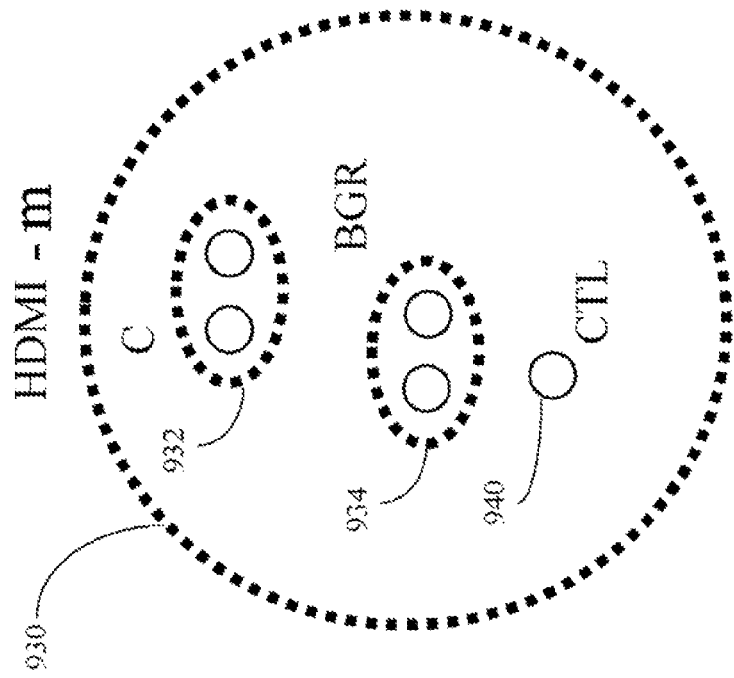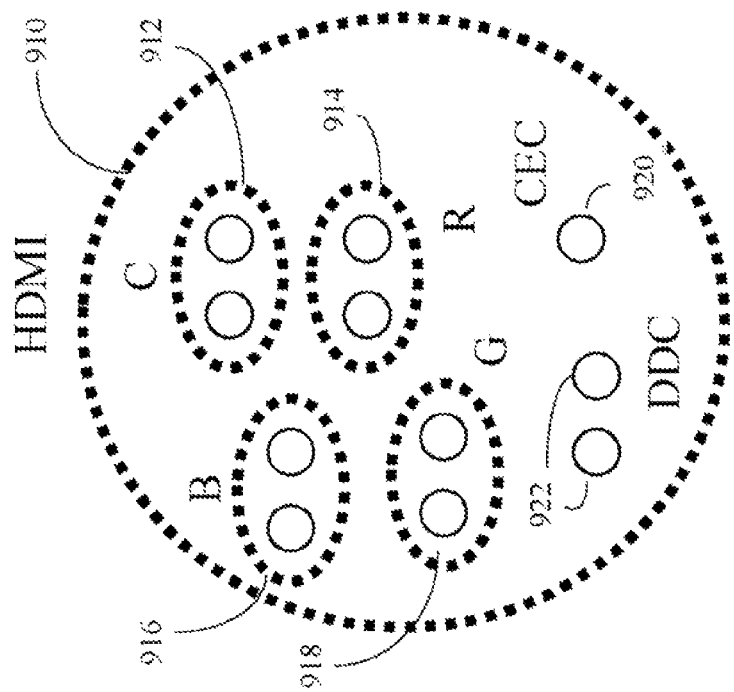
Fig. 9

| PIN | HDMI-M Signal assignment | Standard HDMI Signal assignment |
| --- | --- | --- |
| 1 | NC | TMDS Data2+ |
| 2 | NC | TMDS Data2 Shield |
| 3 | NC | TMDS Data2- |
| 4 | NC | TMDS Data1+ |
| 5 | NC | TMDS Data1 Shield |
| 6 | NC | TMDS Data1- |
| 7 | TMDS Data+ | TMDS Data0+ |
| 8 | TMDS Data Shield | TMDS Data0 Shield |
| 9 | TMDS Data- | TMDS Data0- |
| 10 | TMDS Clock+ | TMDS Clock+ |
| 11 | TMDS Clock Shield | TMDS Clock Shield |
| 12 | TMDS Clock- | TMDS Clock- |
| 13 | NC | CEC |
| 14 | 5V power from RX | Reserved (NC) |
| 15 | USB Data+ | DDC SCL |
| 16 | USB Data- | DDC SDA |
| 17 | GND | DDC/CEC GND |
| 18 | NC | +5V power from TX |
| 19 | Ctrl Bus | Hot Plug Detect |

Fig. 10

DISCOVERY OF ELECTRONIC DEVICES UTILIZING A CONTROL BUS

TECHNICAL FIELD

Embodiments of the invention generally relate to the field of networks and, more particularly, to a method and apparatus for discovery of electronic devices utilizing a control bus.

BACKGROUND

Multiple electronic devices are increasingly connected together to communicate. In one example, entertainment and multi-media devices may be interconnected to transfer or share digital information. The connection of such devices generally requires some form of standard bus or interface to allow the devices to easily connect and communicate with each other.

In one example, the HDMI™ (High-Definition Multimedia Interface) provides an interface that allows for the transfer of uncompressed digital high-definition video and audio, together with associated control signals. (HDMI is a trademark of HDMI Licensing, LLC) HDMI™ includes the High-Definition Multimedia Interface 1.3 (Hitachi, Ltd., Matsushita Electric Industrial Co., Ltd., Philips Consumer Electronics, International B.V., Silicon Image, Inc., Sony Corporation, Thomson Inc., and Toshiba Corporation) (Jun. 22, 2006), as well as earlier versions of HDMI™ Multimedia devices may include any devices capable of providing, storing, or displaying multimedia data, including television monitors, cable and satellite set-top boxes, video players, including DVD (Digital Versatile Disk), HD (High-Definition) DVD, and Blu-Ray players, audio players, digital video recorders, and other similar devices. HDMI™ devices utilize TMDS™ (Transition Minimized Differential Signaling) technology. TMDS™ encoding converts 8 bits per TMDS data channel into a 10-bit DC-balanced, transition minimized sequence, which is then transmitted serially across the pair at a rate of 10 bits per TMDS™ clock period. An HDMI™ connection may include a DDC (Display Data Channel) for configuration and status exchange between a source device and a sink device, and an optional CEC (Consumer Electronics Control) protocol to provide high-level control functions among audiovisual products in a user's environment.

However, the types of electronic devices that are capable of holding and utilizing large quantities of digital data have expanded as the memory capacity and processing power of devices has risen. Such media devices may be mobile or handheld. However, a mobile device may utilize a different type of connection than a standard device because of the smaller physical size. If various types of devices need to exchange data such as media data, a device that is transmitting or receiving such data may be required to identify the type of device or devices that are involved in the data transfer.

SUMMARY

A method and apparatus are provided for discovery of electronic device utilizing a control bus.

In a first aspect of the invention, an embodiment of a method includes connecting a receiving device to a cable, where the cable includes a control bus. If the receiving device is in a disconnect state and a signal from a transmitting device is detected on the control bus, then the device is transferred to a state for a first type of transmitting device. If the receiving device is in either the disconnect state or the state for the first type of transmitting device and a predetermined voltage signal is received from the transmitting device, then the receiving device is transferred to a state for a second type of transmitting device.

In a second aspect of the invention, an embodiment of a method includes connecting a transmitting device to a cable, where the cable includes a single control bus and a power bus. If the transmitting device is in a disconnect state and a predetermined voltage is detected on the power bus, the transmitting device is transitioned to a pending state and the control line is driven with a signal pulse. If the transmitting device is in the pending state and a value of the signal pulse is detected on the control bus when the signal is not being driven, the transmitting device is transitioned to a discovered state, the discovered state indicating that the transmitting device has been discovered by a receiving device.

BRIEF DESCRIPTION OF THE DRAWINGS

Embodiments of the invention are illustrated by way of example, and not by way of limitation, in the figures of the accompanying drawings in which like reference numerals refer to similar elements.

FIG. 9 is an illustration of cables that may be utilized to connect a transmitter and a receiver;

FIG. 10 is an illustration of an embodiment of cable signal assignments for transmitter and receiver cables.

DETAILED DESCRIPTION

Figure 1:
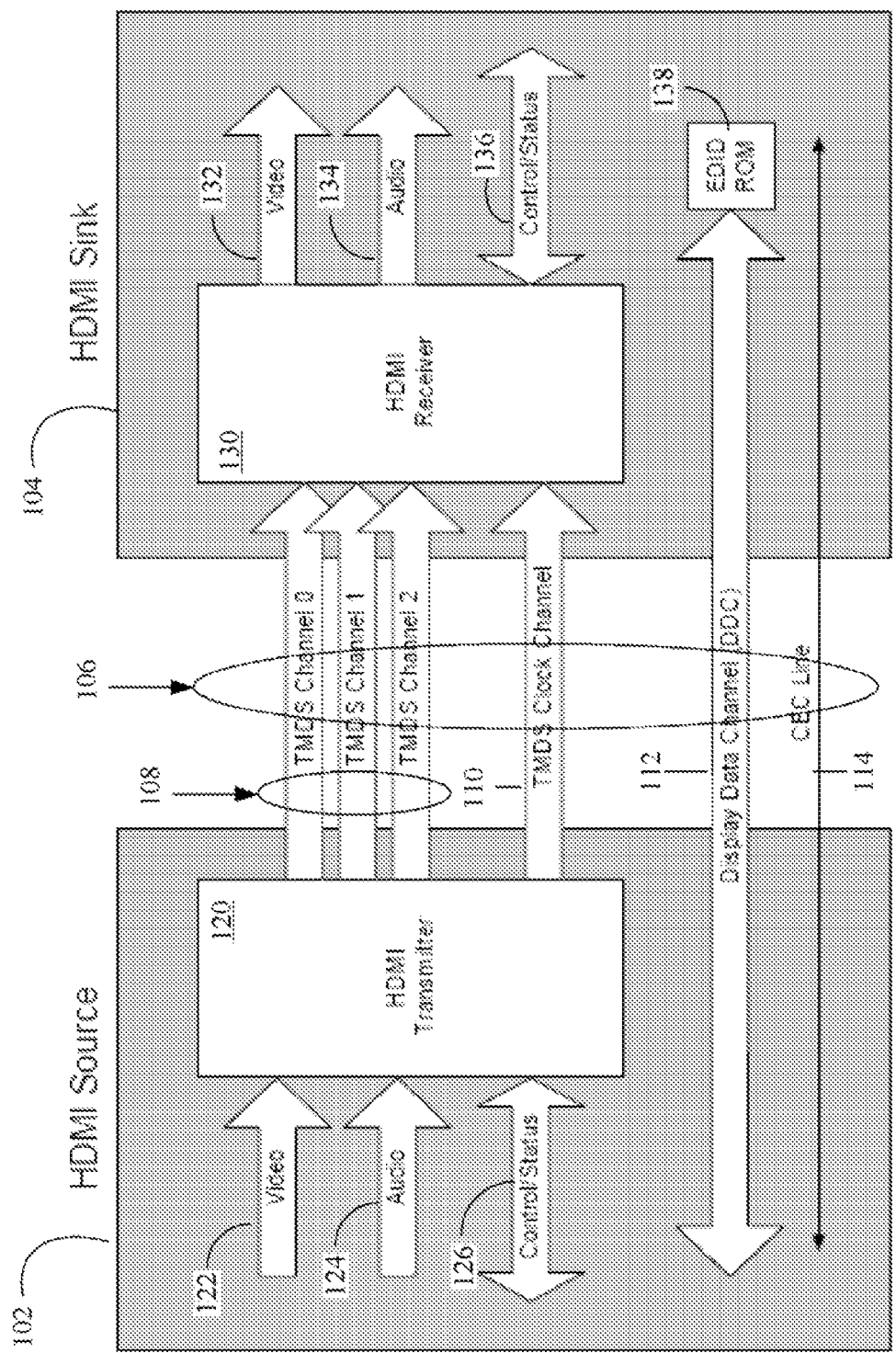
FIG. 1 is an illustration of an embodiment of a connection between electronic devices.

Embodiments of the invention are generally directed to discovery of electronic devices utilizing control and power buses.

As used herein:

"Mobile device" means any mobile electronic device. The term "mobile device" includes, but is not limited to, a cellular telephone, smartphone, PDA (personal digital device), MP3 or other format music player, digital camera, video recorder, digital storage device, and other similar devices.

In some embodiments, a system provides an interface to connect a mobile device to other devices. In some embodiments, a mobile device utilizes a modified protocol to allow connection with other devices, which may utilize a standard protocol. In some embodiments, a standard device is a dual- or multiple-mode device that utilizes a control bus at least in part to discover what type of device is attached to the standard device.

In a particular embodiment, data being transferred between devices may be multimedia data and associated commands, including HDMI™ data and commands. For example, a mobile device containing high-definition video data and related commands may be connected to a standard HDMI™ device (such as, for example, a television or a monitor). However, embodiments of the invention are not limited to any particular type of data or device. As used herein, "HDMI-M" is utilized here to indicate a mobile device utilizing a modified protocol. The HDMI-M device may include the use of USB (Universal Serial Bus) protocol data, utilizing USB-OTG (USB On-The-Go, a standard for portable devices that allows dual-mode operation in which a device may be connected to a personal computer or to another portable device). "HDMI-E" is utilized here to designate a dual-mode device that can be interfaced with a modified protocol mobile device or a standard protocol device.

In an embodiment, a control bus provides a mechanism for discovering what kind of source (such as, for example, a standard TMDS™ device or an HDMI-M device) is connected with a dual-mode receiver. In some embodiments, the control bus is a single-wire (one-bit), bi-directional control bus. In some embodiments, the control bus further provides a hot-plug mechanism for a source, such as an HDMI-M source. In some embodiments, the control bus is used to provide an ID bit to the USB-OTG companion physical layer of the source device. In an embodiment, a transmitting device and a receiving device each include logic to detect signals on the control bus. In an embodiment, a transmitting device and a receiving device each further include logic to detect power signals that are received.

In some embodiments, a dual mode HDMI™ device may be faced with two possible modes of operation, which may utilize different cables:

(1) An HDMI-M source (data providing device) may be connected to the dual-mode sink (data receiving device) via a Type-M (indicating a connection to a HDMI-M device) to Type-E (indicating a connection to a dual-mode HDMI-E device) cable, in which case both HDMI™ and USB protocols can be operational. In some embodiments, the control bus initiates discovery on the sink side, followed by hot plug detection on the source side. In an embodiment, the control bus is also used to provide an ID assignment to the USB-OTG physical layer on the source side.

(2) An HDMI™ source may be connected to the dual-mode sink via a standard HDMI™ cable. In some embodiments, standard HDMI™ signal operations may be utilized.

In addition, two HDMI-M source devices may be connected together via a Type-M to Type-M cable. In this instance, only USB-OTG may be operational. In an embodiment, a Type-M to Type-M cable does not physically have any wires connecting TMDS clock, data, and control bus lines. In an embodiment, one end of the cable has its control bus pin shorted to ground. In this case, the control bus pin is only used to provide an ID assignment to the USB-OTG physical layer on either side.

In some embodiments, an HDMI-M control bus is pulled high on the transmitter chip via an active pull-up circuit (which may utilize an impedance of approximately 10 kΩ, in one example). Further, the control bus may be pulled low on the receiver chip using a very weak active pull-down circuit (which may utilize an impedance of approximately 100 kΩ, in one example). This active pull-down should be disabled (i.e. the pad should be tristated) when there is no power to the receiver.

In some embodiments, a pad for the control bus is combined with a pad for a hot plug in a receiving device, with the control bus being mapped to the HTPLG pin on the receiver side. In this manner, the control bus can serve multiple purposes in the operation of the transmitter and receiver.

In some embodiments, an HDMI-M transmitter chip provides an ID output to the USB PHY. This should normally be driven high, even in low-power state. The HDMI-M receiver chip does not need to provide an ID output to the USB PHY on the receiver side—this device will always be configured as a host.

In an embodiment, a discovery and hot plug sequence when a mobile transmitting device is connected to a dual-mode receiving device is as follows:

1. The transmitter has a pull-up circuit and the receiver has a pull-down circuit on a control bus. Initially, the transmitter has an ID pin driven high. Both devices are in a cable disconnect state.

2. A cable (such as a Type-M to Type-E cable) is connected between the transmitter and the dual-mode receiver. The transmitter detects presence of a +5V power signal from the receiver on a 5V Power pin, and transitions to the pending state. The control bus is being driven low from the receiver because it is shared with a hot plug pin.

3. While in pending state, the transmitter repeatedly pulses the control bus high for 1 ms and tristates the control bus for 1 ms. When the transmitter is not driving the control bus, the transmitter checks to see if the receiver has stopped driving the control bus low.

4. The receiver detects a high value on the control bus. This is an indication to the receiver that the transmitter is a mobile transmitter (such as an HDMI-M transmitter) and is driving the control bus high. A standard HDMI™ transmitter will not drive this wire high. In response, the receiver disables its hot plug functionality and enables a 100K pull-down on control bus. The receiver is now in the mobile device connect state.

5. If the transmitter detects that the control bus is low when the transmitter is not driving it, the transmitter transitions to the discovered state and stops pulsing the control bus.

6. At this point, both the transmitter and the receiver are ready to start communicating via the control bus. Either side can arbitrate on the control bus.

7. The transmitter will transition to the cable disconnect state if it loses the +5V signal from the receiver.

8. The receiver will transition to the cable disconnect state if it sees a long low on the control bus, indicating that the cable has been disconnected.

In an embodiment, if the receiver is powered down, it should not pull down on the control bus. This will prevent draining current from the transmitter (120 KΩ at 1.2V— about 10 μA).

In an embodiment, a discovery and hot plug sequence for two mobile transmitting devices (such as HDMI-M source devices) that are connected is as follows:

1. A cable (such as a Type-M to Type-M) cable is connected between two transmitters.

2. On a side of the cable on which the control bus shorted to ground, the transmitter detects a change in signal level from a high to a low. This momentarily wakes up the transmitter control bus state machine.

3. The transmitter detects the presence of a constant low level on the control bus. This would occur only if connected to the host end of a cable.

4. The transmitter drives its ID output low, which marks the USB PHY as a host device.

5. The USB PHY starts driving +5V on to a power bus, which provides a hot-plug signal to the transmitter on the peripheral side of the cable.

7. The peripheral transmitter continues to drive its ID pin high. This marks its USB PHY as a peripheral device.

8. The peripheral transmitter attempts to initiate arbitration on the control bus, and would give up after several attempts.

9. Both the host and peripheral transmitters go to low-power mode after a timeout. They maintain their respective low and high values on the ID outputs.

In an embodiment, a Type-M to Type-M cable continues to draw current out of the host transmitter (20 KΩ to GND at 1.2V—about 60 μA). This is similar to the case of the host side of a USB-OTG cable. In an embodiment, this may be the current may reduced by placing the 10 KΩ pull-up circuit on chip, and increasing its value to 100 KΩ whenever the chip drives an ID of 0. This will reduce the current to about 12 uA.

FIG. 1 is an illustration of an embodiment of a connection between electronic devices. In this illustration, two electronic devices are connected via a cable. In particular, an HDMI™ source 102 (providing an HDMI™ output) is coupled with an HDMI™ sink 104 (receiving an HDMI™ input) via a cable 106. The HDMI™ source 102 includes a transmitter 120, which receives video data 122 and audio data 124 and transfers control and status data 126. Similarly, the HDMI™ sink 104 includes a receiver 130, which provides video data 132 and audio data 134 and transfers control and status data 136.

The cable 106 includes three data channels 108 (TMDS™ Channels 0, 1, and 2) and a TMDS™ clock channel 110 from the HDMI™ source 102 to the HDMI sink 104, together with a DDC channel 112, coupled to EDID (Extended Display Identification Data) ROM 138 in the HDMI™ sink 104, and a CEC line 114. In some embodiments, the channels carried via the cable 106 are combined to provide for mobile operation. In particular, the data channels 108 may be combined into a single data channel, and the DDC channel and CEC channel may be combined into a single control channel. In some embodiments, the channels are combined as provided in FIG. 2.

Figure 2:
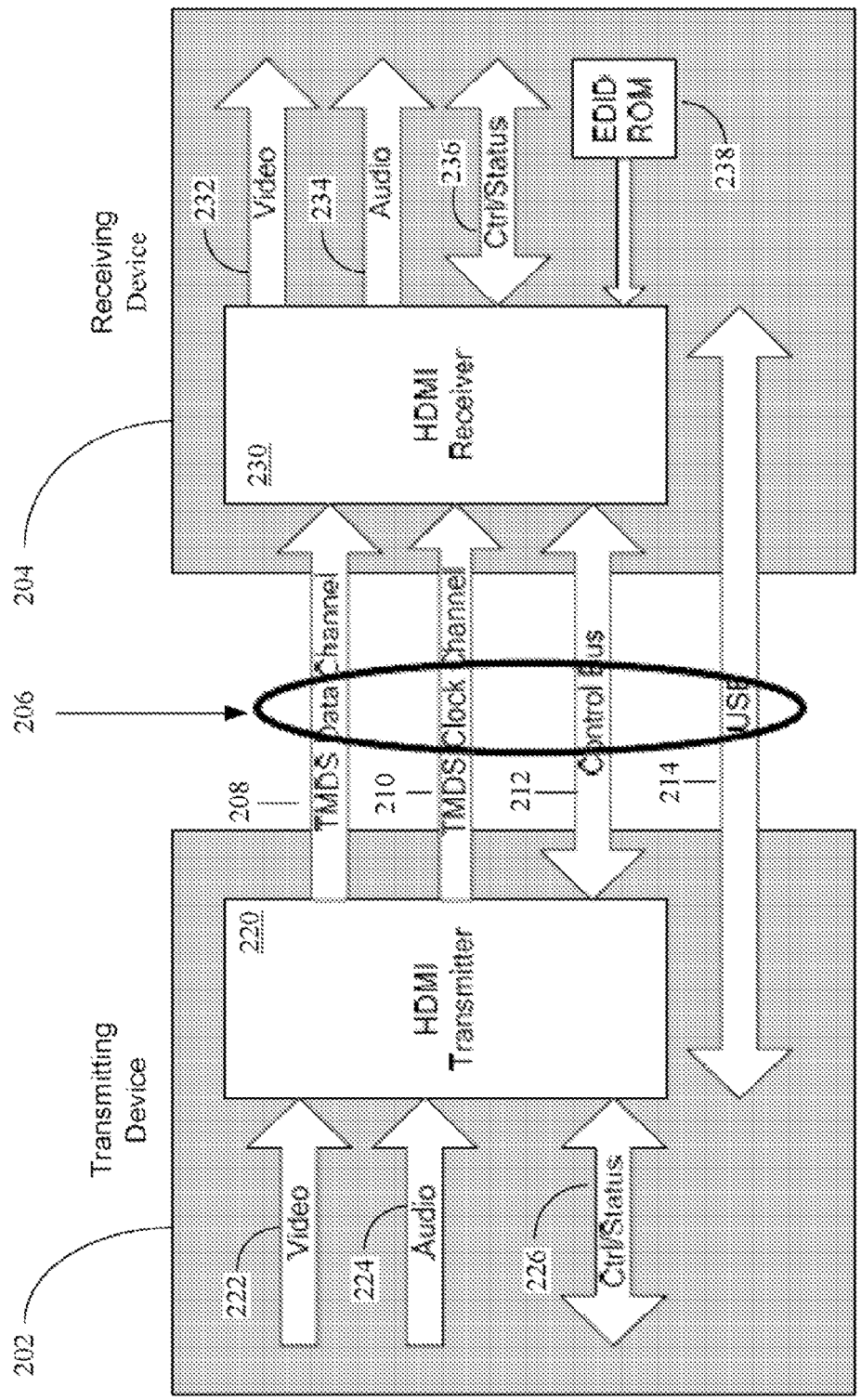
FIG. 2 is an illustration of an embodiment of a connection between a data transmitter and a data receiver.

FIG. 2 is an illustration of an embodiment of a connection between a data transmitter and a data receiver. In this illustration, two electronic devices are connected via a cable. In particular, a HDMI-M transmitting device 202 is coupled with an HDMI-M receiving device 204 via a cable 206. The HDMI-M transmitting device 202 includes a transmitter 220, which receives video data 222 and audio data 224 and transfers control and status data 226. Similarly, the HDMI-M receiving device 204 includes a receiver 230, which provides video data 232 and audio data 234 and transfers control and status data 236.

The cable 206 includes a single data channel 208 (TMDS™ Channel) and a TMDS™ clock channel 210 from the HDMI-M transmitting device 202 to the HDMI-M receiving device 204, together with a single control bus 212 and a USB bus 214. In an embodiment, the EDID ROM 238 in the HDMI-M receiving device 204 is coupled with the receiver 230. In some embodiments, the single TMDS™ data channel 208 carries all video and audio data, and the single control bus 212 carries all control data. In some embodiments, the single control bus 212 is further utilized in a discovery process to determine what type of device is utilized as the transmitter 202.

Figure 3:
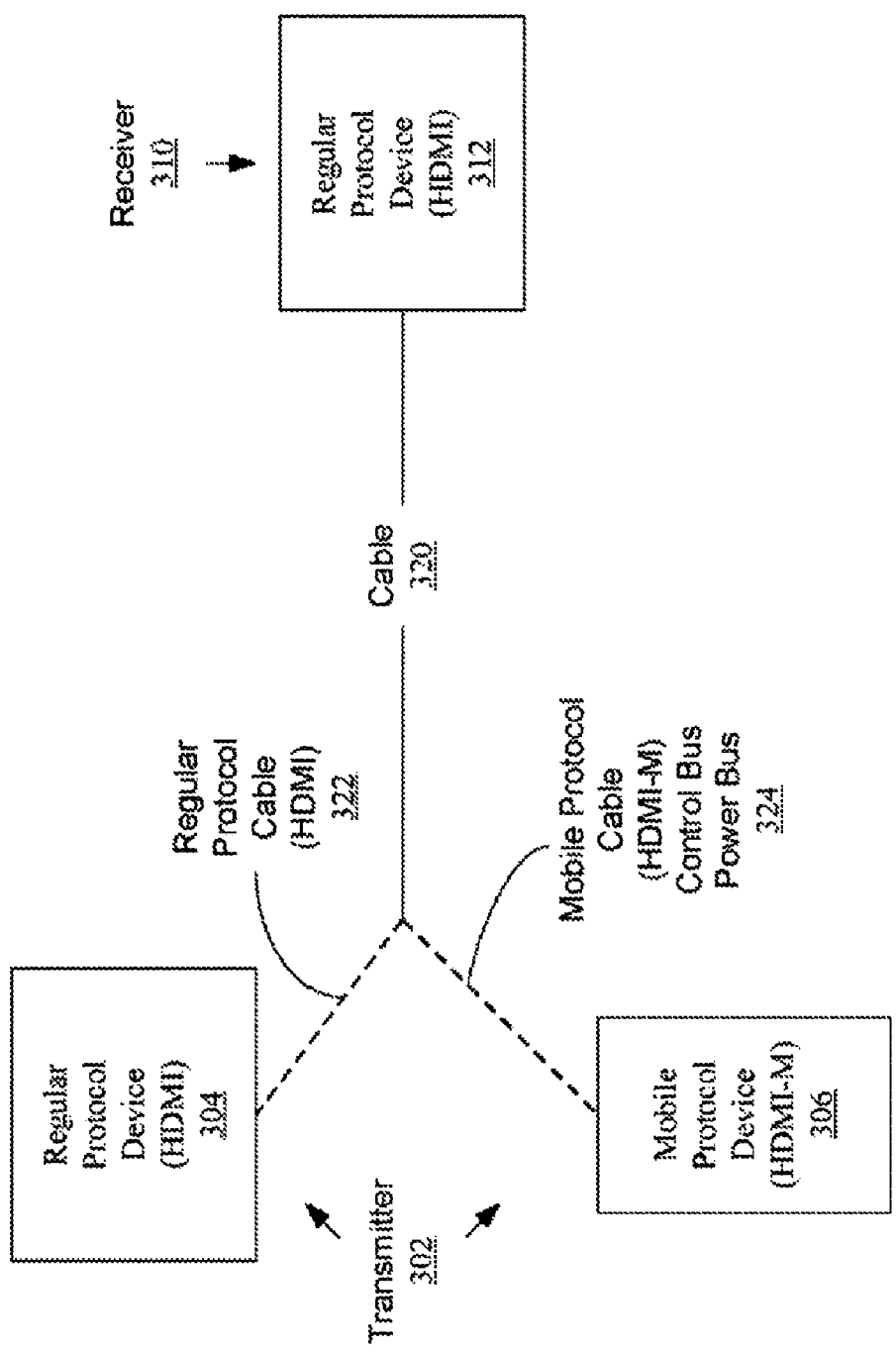
FIG. 3 is an illustration of an embodiment of a transmitting device coupled with a receiving device.

FIG. 3 is an illustration of an embodiment of a transmitting device coupled with a receiving device. In this illustration, a transmitter 302 is coupled to a receiver 310 via a cable 320. In this illustration, the receiver 310 may be standard protocol device 312, which may include a dual-mode HDMI™ receiving device. In some embodiments, the dual-mode HDMI™ receiving device would be capable of communicating with either an HDMI transmitter or an HDMI-M transmitter. In some embodiments, the transmitter 302 may be one of multiple types of devices. In this illustration the transmitter may be a first type of transmitting device, shown as a standard protocol device 304, such as a HDMI™ transmitting device, or a second type of device, which is shown as a mobile protocol device 306. The mobile protocol device 306 may be an HDMI-M transmitting device, such as handheld or other mobile media device. In some embodiments, the cable 320 may be either a standard protocol cable 322 for the connection of standard protocol devices (such as an HDMI™ compatible cable), or a mobile protocol cable 324 (such as an HDMI-M compatible cable), including a single control cable and a power cable. In some embodiments, the receiver 310 utilizes the signals received on the cable 320 to discover a connection with the transmitter 302, and the transmitter utilizes the signals on the cable 320 to assist in establishing a connection, such as a hot plug connection, with the receiver 310.

Figure 4:
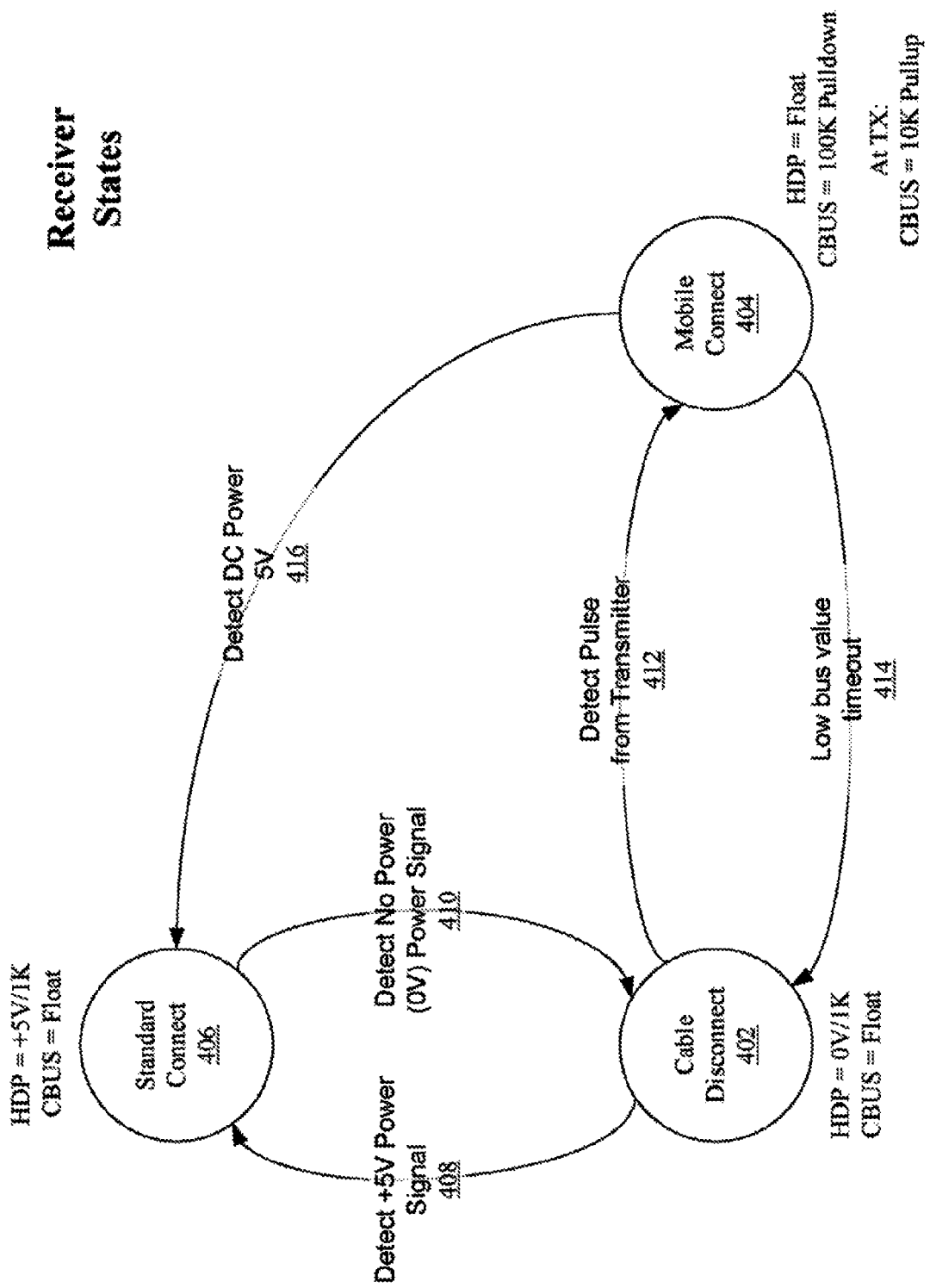
FIG. 4 is an illustration of transitions between states for a receiver in a device discovery process.

FIG. 4 is an illustration of transitions between states for a receiver in a device discovery process. In an example, the receiver may provide for discovering which type of transmitter is connected to the receiver. The receiver may be coupled with a cable including one or more control buses. In addition, the cable may include one or more lines to transmit power. The nature of the buses will depend on the nature of the transmitting device connected to the receiver. In some embodiments, the control bus may provide a mechanism for a multi-mode receiver to determine what type of transmitter the receiver is coupled with via the control bus. For example, the control bus may provide a mechanism for discovering whether an HDMI™ transmitter (a standard protocol device) or an HDMI-M transmitter (a mobile protocol device) is connected with the transmitter. In some embodiments the control line further provides a hot plug mechanism for an HDMI-M (mobile device) transmitter. In some embodiment, the control bus may further be used to provide and ID bit to an USB-OTG companion phy. In some embodiments, a power bus (VBUS) provides power from the receiver to a mobile transmitter (such as from an HDMI™ receiving device to an HDMI-M transmitting device), and the power bus may also be utilized in establishing a connection. In some embodiments, a transmitting device may detect the presence of the receiver power signal (such as a 5 volt power signal) in device discovery.

In this illustration, a dual-mode receiver may initially be in a cable disconnect state 402, with the receiver transitioning to the cable disconnect state upon any reset. The receiver may transition from the cable disconnect state 402 to a standard device connect state 406, which may correspond to operation in the standard HDMI™ mode, and a mobile device connect state 404, which may correspond to operation in the HDMI-M mode. In some embodiments, the receiver remains in the cable disconnect state 402 as long as the control bus is at low and there is no power provided on the VBUS. In this state, an HDMI™ receiver will drive the hot plug (which is the same line as the control line for a HDMI-M cable) to low as provided in the HDMI™ specification for hot plug detect. In this state, the control bus pulldown circuit is disabled.

In some embodiments, the receiver transitions from the cable disconnect state 402 to the standard device connect state upon detecting a +5V power signal from the transmitter 408. This implies that the receiver is coupled with a standard protocol device, such as an HDMI™ transmitter, because this signal would not be connected for an HDMI-M device. In this state, the receiver should drive the hot plug down to low in accordance with the HDMI™ specification for hot plug detection (with a voltage between 2.4V-5.3V/1 KLQ). In this state, the control bus pulldown should be disabled. Further, the receiver will transition from the mobile device connect state 404 to the standard device connect state 406 upon detecting a power signal from the transmitter 416. Thus, the receiver will transition from any state, either the cable disconnect state 402 or the mobile device connect state 404, to the standard device connect state 406 upon the receiver detecting the +5V power signal from the transmitter.

In some embodiments, the receiver transitions from the cable disconnect state 402 to the mobile device connect state 404 upon the receiver detecting a pulse (in one example the pulse may be 100 us high, 100 us low) on the control bus 412. In an embodiment, the signal pulse is an indication that that the signal is being driven by an HDMI-M transmitter. In an embodiment, upon transitioning to the mobile device connect state 404 the receiver will tristate its hot plug pad and enable a control bus pulldown circuit. In an embodiment, the pulldown circuit is relatively weak, with a resistance in the range of 100K ohms. In an embodiment, the receiver drives its mode output high on the control bus, and is driving the power bus at +5 volts.

In an embodiment, the receiver transitions from the standard device connect state 406 to the cable disconnect state 402 upon detection of a 0V power signal from the transmitter 410, which is indicative of the cable disconnecting or the transmitter stopping operation. In an embodiment, the receiver transitions from the mobile device connect state 404 to the cable disconnect state 402 upon detecting a long time period (over a certain number of cycles) in which the control bus is at a low value 414. This is indicative of the cable being disconnected and pulled low by the receiver's pulldown circuit or the mobile device ceasing operation.

Figure 5:
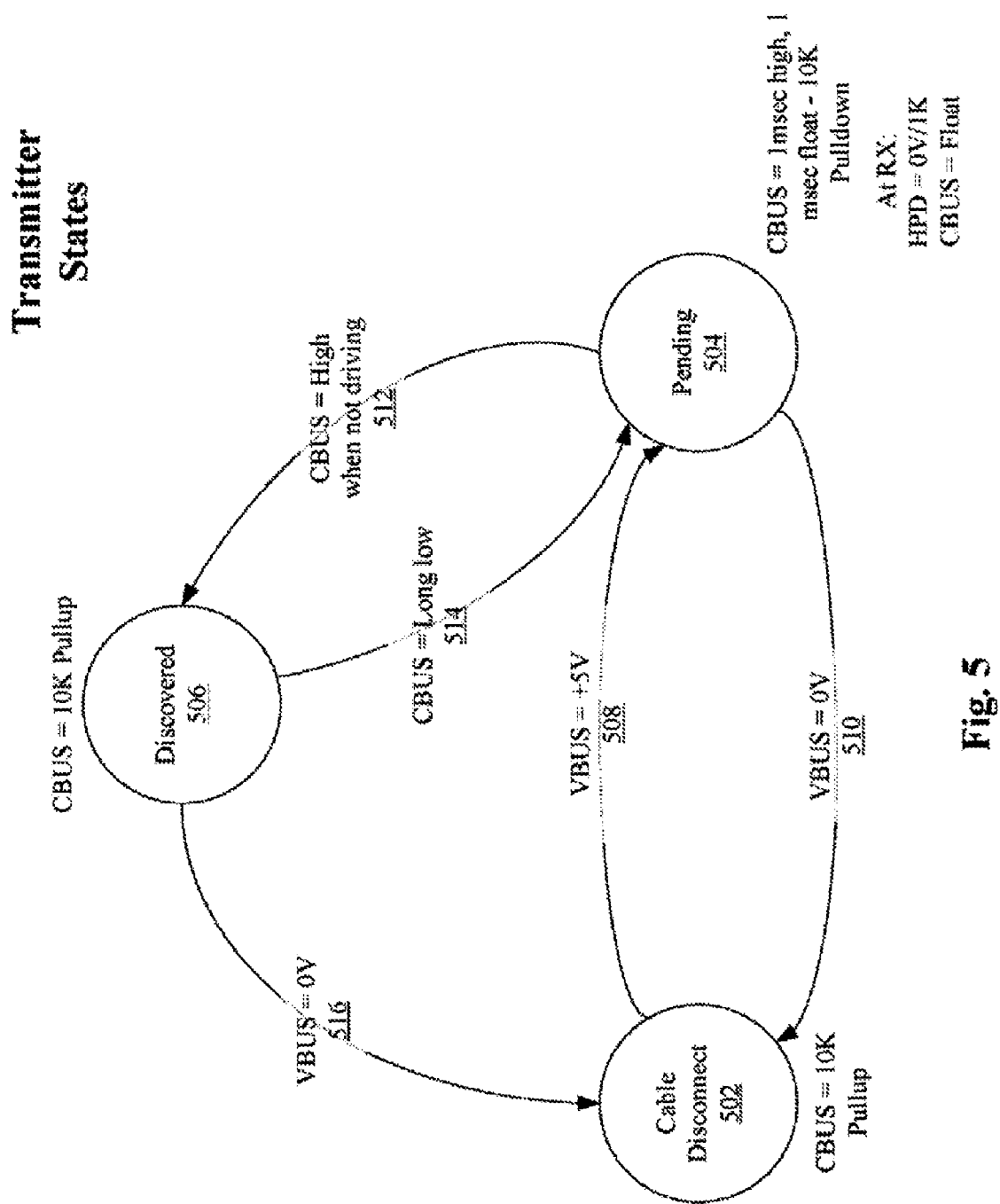
FIG. 5 is an illustration of transitions between states for a transmitter in a device discovery process.

FIG. 5 is an illustration of transitions between states for a transmitter in a device discovery process. In this illustration, the transmitter may transition between a cable disconnect state 502, a pending state 504 for use when the transmitter is waiting for confirmation of discovery by a receiver, and a discovered state 506 for operation after discovery. The transmitter is in the cable disconnect state upon reset and stays in this state while the power bus is at low. In this state, a pull-up circuit, which may be a 10K ohm pull-up in one example, is enabled.

In some embodiments, the transmitter transitions to the pending state 504 upon detecting a logical '1' (+5V) on the VBUS 508. This signal implies that the transmitter is connected to an HDMI™ receiver, but that the transmitter has not yet been discovered by the receiver because the receiver is still driving a low signal onto the CBUS (which doubles as the HTPLG of the receiver). In this state, the transmitter will pulses the CBUS, with, for example, the signal pulse being approximately 100 us drive high, 100 us float).

In some embodiments, the transmitter monitors the value on the CBUS while in the pending state 504 during the time when the CBUS is not being driven by the transmitter. If the transmitter detects a high value on the CBUS while not driving a high signal 512, this means that the receiver has discovered the presence of the transmitter and has tristated its HTPLG pad. The transmitter transitions to the discovered state 506, and enables the 10K pull-up circuit on the CBUS. In some embodiments, if the VBUS returns to 0 volts (510 and 516) in either the pending state 504 or the discovered state 506, this indicates that the receiver is no longer connected or operating, and the transmitter transitions back to the cable disconnect state 502. Further, if a long low signal is detected on the CBUS while the transmitter is in the discovered state 514, the transmitter will transition back to the pending state 504.

Figure 6:
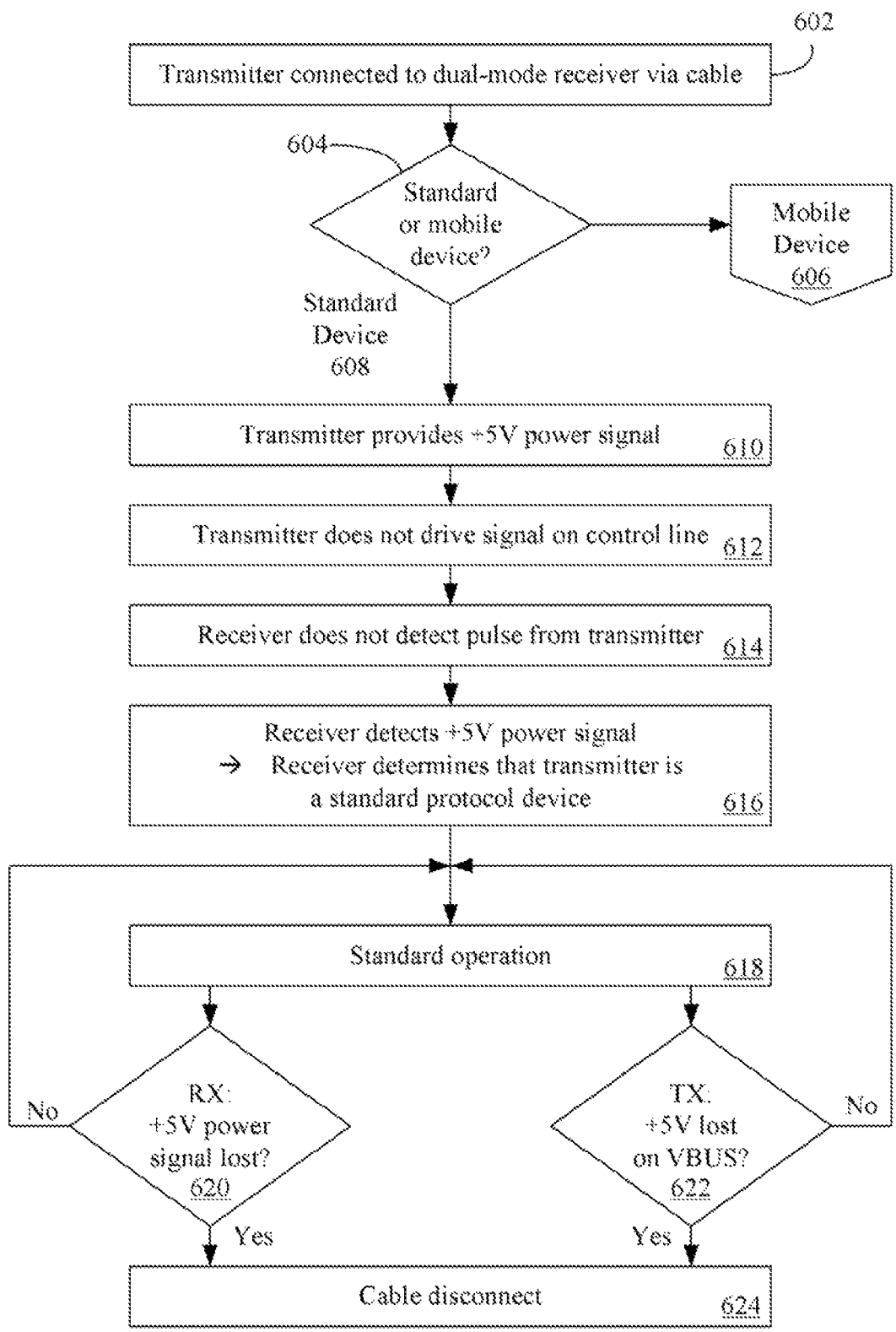
FIGS. 6 and 7 are flowcharts to illustrate an embodiment of a discovery process for connected devices.
Figure 7:
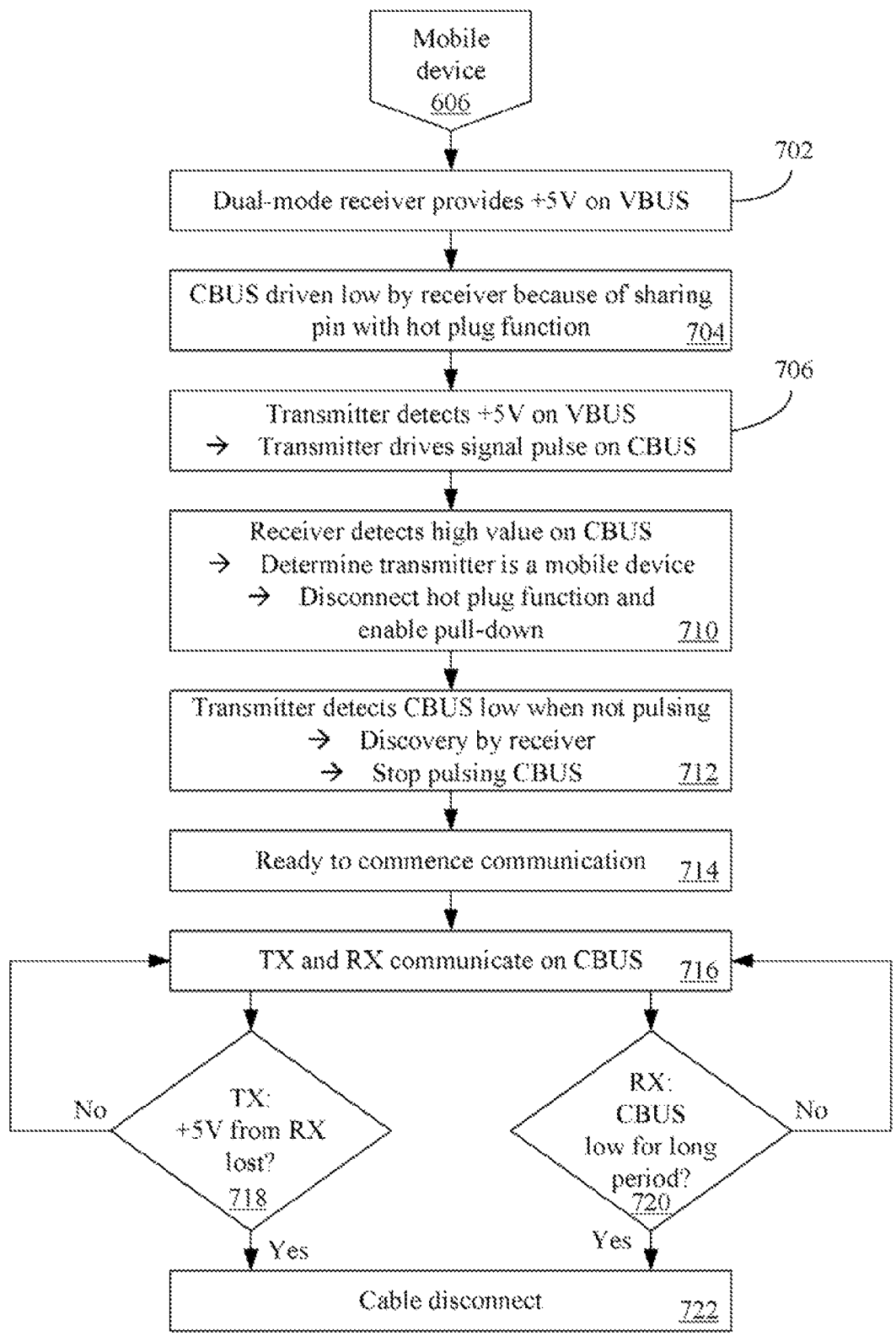

FIGS. 6 and 7 are flowcharts to illustrate an embodiment of a discovery process for connected devices. In this illustration, a transmitter is connected to a dual-mode receiver via a cable 602. The transmitting device may be either of two types of devices, such as either a standard device or a mobile device 604. For example, a transmitting device may be either a standard HDMI™ device or an HDMI-M device. If the device is a mobile device 606, the processes may be as described in FIG. 7. If the device is standard device 608, the transmitter will provide a +5V value on the +5V from transmitter line 610, and the transmitter will not drive a signal on the control line 612 (which may be the hot plug line for a standard device).

In an embodiment, the receiver will not receive a signal pulse from the transmitter 614. The receiver will detect a +5V power signal, with the receiver thus determining that the transmitter is a standard protocol device 616, such as an HDMI™ device. The devices then may engage in standard operation 618, such as a standard connection between HDMI™ devices. Such standard operation may continue until, for example, the receiver determines that the +5V power signal is lost 620 or the transmitter determines that the +5V power is lost on the VBUS 622, which indicate a cable disconnect state 624.

FIG. 7 then illustrates processes for a mobile device transmitter 606, such as an HDMI-M transmitting device. In an embodiment, a dual-mode receiver provides a +5V signal on the VBUS 702. The control bus is then driven low by the receiver because of the sharing of CBUS with a hot plug function 704. The transmitter detects the +5V on the VBUS, and in response the transmitter drives a signal pulse on the control bus 706. The receiver detects the high value on the CBUS, and in response the receiver determines that the transmitter is a mobile device, and the receiver disconnects the hot plug function and enables a pull-down circuit on the CBUS 708. As a result of the pull-down circuit, the transmitter detects that the CBUS signal is low when the transmitter is not driving a pulse on the control bus, and thus the receiver determines that the transmitter has been discovered by the receiver, and the receiver ceased pulsing on the control bus 712. The devices are ready to commence communication 714, and the transmitter and receiver communicate using the control bus 716. This process may continue until, for example, the transmitter determines that the +5V power supply from the transmitter is lost 718 or the receiver determines that the control bus has been low for a long period of time 720, which indicate a cable disconnect state 722.

Figure 8:
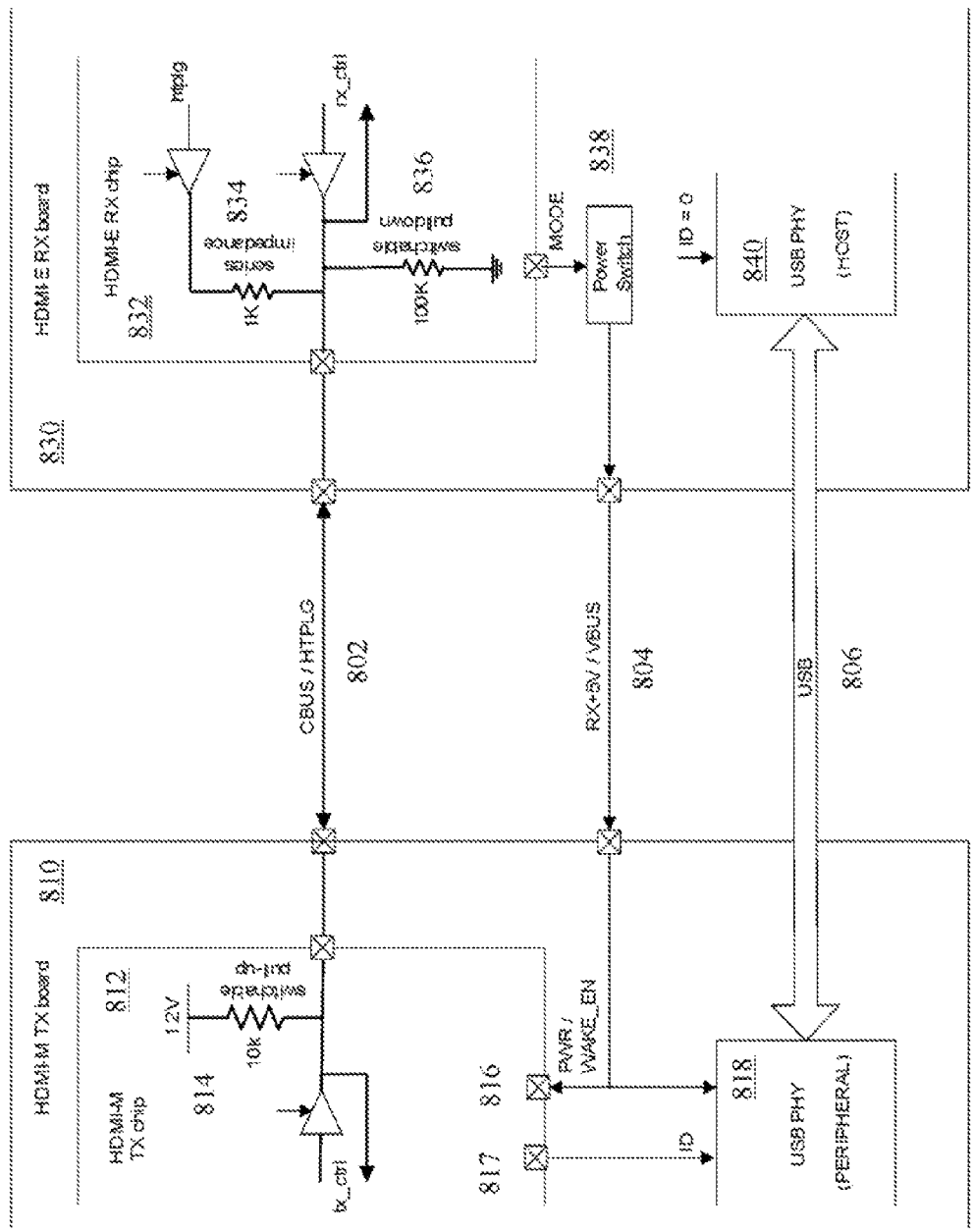
FIG. 8 is an illustration of an embodiment of a mobile device coupled with a standard device via a control bus.

FIG. 8 is an illustration of an embodiment of a mobile device coupled with a standard device via a control bus. In some embodiments, a transmitter is an HDMI-M transmitter board 810 and a receiver is an HDMI-E (dual-mode) receiver board 830. The HDMI-M transmitter board 810 includes an HDMI-M transmitter chip 812, and the HDMI-E receiver board 830 includes an HDMI-E receiver chip 832. Cable connections between the transmitter and receiver include a control bus CBUS 802 that shares pads with a hot plug pin (HTPLG) 834, a power bus VBUS 804 by which the receiver 830 provides a +5V signal to the transmitter 810 via a power switch 838, and a USB connection 806 (between a USB PHY peripheral 818 and a USB PHY host 840). In some embodiments, the HDMI-M transmitter chip 812 and HDMI-E receiver chip 832 include logic to detect signals on the control bus 802, as well as logic to detect power signals sent via the VBUS 804 or other power connection. The transmitter 810 includes a switchable pull-up circuit 814 (shown as a 10K Ω impedance connected to 1.2V source) and the receiver has a switchable pull-down circuit 836 (shown as a 100K Ω impedance connected to ground) on the CBUS 802. In operation, initially the transmitter has an ID pin 817 driven high, with both devices are in a cable disconnect state. A Type-M to Type-E cable is connected between the HDMI-M transmitter 810 and multi-mode receiver 830. The transmitter 810 detects the presence of the receiver's +5V power provided on the transmitter's power/wake enable (PWR/WAKE_EN) pin, and the transmitter 810 transitions to the pending state. In this circumstance, the CBUS 802 is being driven low from the receiver 830 because the CBUS is shared with the HTPLG pin 834.

While in a pending state, the transmitter 810 repeatedly pulses the CBUS 802 high for 100 us and tristating the bus for 100 us. When the transmitter 810 is not driving the CBUS 802 high, the transmitter 810 determines the state of the CBUS 802 to determine if the receiver 830 has stopped driving the CBUS low.

In an embodiment, the receiver 830 detects a high value on the CBUS 802. This is an indication to the receiver 830 that the transmitter is an HDMI-M transmitter and is driving the CBUS high. A standard HDMI™ transmitter will not drive this wire high. In response, the receiver 830 disables its HTPLG functionality and enables a 100K pulldown on CBUS. The receiver is now in the HDMI-M connect state.

When the transmitter 810 detects that the CBUS 802 is low when it is not driving it, it transitions to the discovered state and stops pulsing the CBUS. At this point, both the transmitter 810 and the receiver 830 are ready to start communicating via the CBUS 802. Either side can arbitrate for use of the CBUS 802.

The transmitter 810 will transition to the cable disconnect state if it loses the receiver +5V power signal. The receiver 830 will transition to the cable disconnect state if it sees a long low on the CBUS 802, indicating that the cable has been disconnected. In an embodiment, if the receiver 830 is powered down, the receiver 830 does not pull down on the control bus 802. This process assists in preventing the draining of current from the transmitter (with current being 120 KΩ at 1.2V—about 10 uA).

FIG. 9 is an illustration of cables that may be utilized to connect a transmitter and a receiver. As illustrated, a cable for a standard device, such as an HDMI™ cable 910, may include a clock channel 912 for signal timing, and multiple data channels (which in this instance are blue 916, green 918, and red 914). The HDMI™ cable 910 may further includes control channels, including a DDC channel 922 (the DDC channel having two wires) and a CEC line 920 (the CEC channel having a single wire). (The cable may include other lines, such as a +5V power signal line, a hot plug detect, and a USB data channel, which are not illustrated here.) For a mobile device, a cable may utilize reduced number of lines by combining the signals. For example, an HDMI-M cable 930 may only include the clock channel 932 together with a single data channel for combined data (such as the Blue-Green-Red line 934) and a single control channel 940 for combined control data. In an embodiment, cables may be utilized to carry signals from either a standard HDMI™ transmitter or an HDMI-M mobile transmitter to a dual-mode receiver, which is capable of discovering which type of transmitter is attached to it.

FIG. 10 is an illustration of an embodiment of cable signal assignments for transmitter and receiver cables. The illustrated signal assignments provide one example of connections that may be used, but embodiments of the invention are not limited to any particular pin assignment choices. As shown, two data channels of the standard HDMI™ assignment (pins 1 through 6) have no counterpart in the HDMI-M assignment. The third HDMI™ data channel (pins 7-9) connects to the single data channel of the HDMI-M assignment. The clock (pins 10-12) may be unchanged. The CEC channel (pin 13) for HDMI™ may have no counterpart in HDMI-M. A reserved pin (pin 14) for HDMI™ may become a pin to provide +5V power (a VBUS) from the receiver to the transmitter. The DDC channel (pins 15 and 16) for HDMI™ may be utilized as USM data for HDMI-M. The +5V power from a transmitter (pin 18) from the transmitter may have no counterpart in HDMI-M). Finally, a hot plug detect (pin 19) from HDMI™ may be coupled with a control bus for carrying merged signals in HDMI-M).

Figure 11:
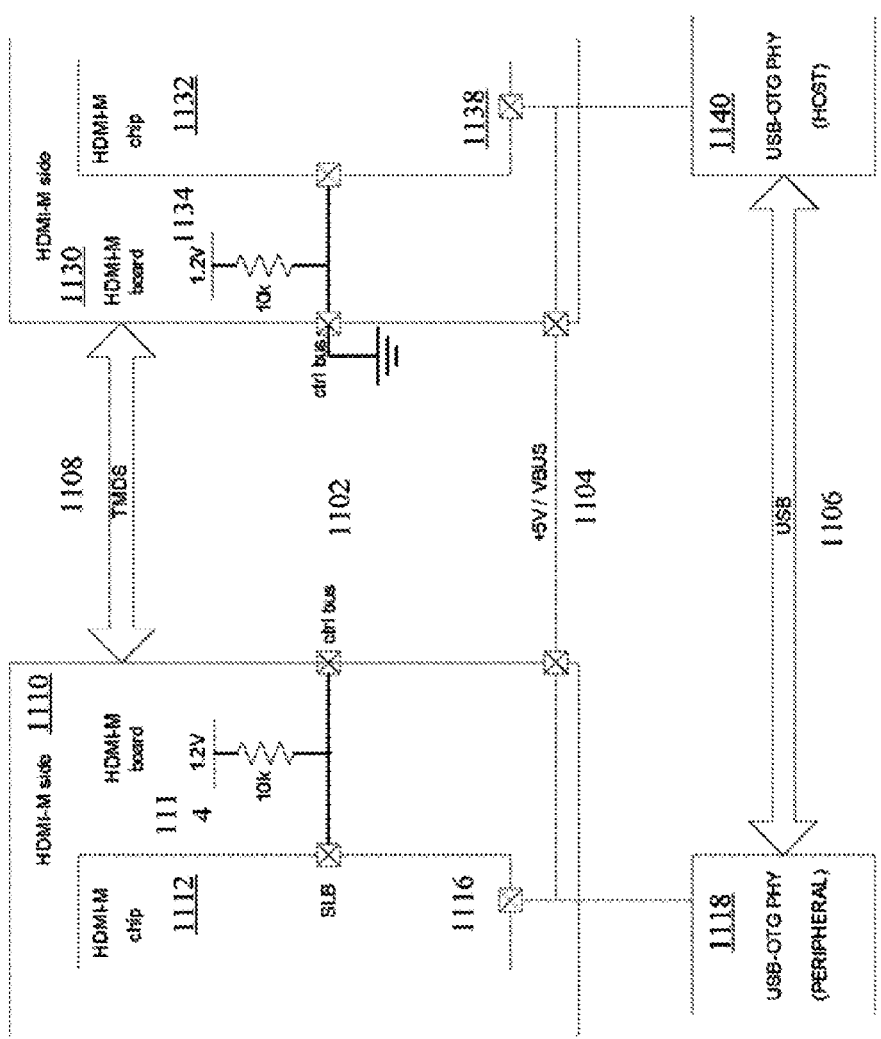
FIG. 11 is an illustration of an embodiment of a connection between two mobile devices.

FIG. 11 is an illustration of an embodiment of a connection between two mobile devices. In this illustration, a first mobile device 1110 (a first HDMI-M side) may be connected to a second mobile device 1130 (a second HDMI-M side). As these are mobile devices, both devices include a pull-up circuit 1114 and 1134. The devices are connected via a VBUS 1104, which is not powered, and a USB connection 1106. The devices may further include a TMDS™ (Transition Minimized Differential Signaling) bus 1108. The USB bus 1106 connects a first USB PHY 1118 to a second USB PHY 1140. However, the connection of the two mobile devices results in a disconnected control bus. In an embodiment, the connection of the cable grounds the control bus 1102 at the second mobile device 1130, causing the USB PHY 1140 of the second mobile device 1130 to be designated as the host device and the USB PHY 1118 of the first mobile device 1118 to be designated as a peripheral device.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. There may be intermediate structure between illustrated components. The components described or illustrated herein may have additional inputs or outputs which are not illustrated or described.

Various embodiments of the present invention may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments of the present invention may be provided as a computer program product, which may include a computer-readable medium having stored thereon computer program instructions, which may be used to program a computer (or other electronic devices) to perform a process according to the embodiments of the present invention. The machine-readable medium may include, but is not limited to, floppy diskettes, optical disks, compact disk read-only memory (CD-ROM), and magneto-optical disks, read-only memory (ROM), random access memory (RAM), erasable programmable read-only memory (EPROM), electrically-erasable programmable read-only memory (EE-PROM), magnet or optical cards, flash memory, or other type of media/machine-readable medium suitable for storing electronic instructions. Moreover, the present invention may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the embodiments of the present invention is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example of the present invention. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments of the present invention, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims are hereby expressly incorporated into this description, with each claim standing on its own as a separate embodiment of this invention.

The invention claimed is:

1. A method comprising:
    connecting a receiving device to a cable, the cable including a single wire control bus and a power bus, the receiving device initially being in a disconnect state, the disconnect state indicating that the receiving device is not connected to a transmitting device;
    enabling a voltage potential of a predetermined value on the power bus;
    driving a signal on the control bus by the receiving device at a first signal value;
    when the receiving device is in the disconnect state and a signal of a first value from a transmitting device is detected by the receiving device on the control bus, transitioning the receiving device to a first state for a connection with a first type of transmitting device, transitioning the receiving device to the first state including disabling hot plug functionality and enabling a pull down for the control bus by the receiving device; and
    when the receiving device is in either the disconnect state or the first state and a predetermined power signal provided by the transmitting device is detected on the power bus by the receiving device, then transitioning the receiving device to a second state for a second type of transmitting device.

2. The method of claim 1, wherein when the receiving device is in the second state and the power signal on the power bus is no longer detected by the receiving device, further comprising transitioning the receiving device from the second state to the disconnect state.

3. The method of claim 1, wherein when the receiving device is in the first state and when a low value on the control bus is detected by the receiving device for a predetermined amount of time, further comprising transitioning the receiving device from the first state to the disconnect state.

4. The method of claim 1, wherein the second type of device is a device compatible with a protocol, and the first type of device is a mobile device compatible with a modified protocol.

5. The method of claim 4, wherein the protocol provides an interface that allows for the transfer of uncompressed digital high-definition video and audio, together with associated control signals.

6. A method comprising:
    connecting a transmitting device to a cable, the cable including a single wire control bus and a power bus, the transmitting device initially being in a disconnect state, the disconnect state indicating that the transmitting device is not connected to a receiving device;
    when the transmitting device is in the disconnect state and a predetermined voltage is detected on the power bus, transitioning the transmitting device to a pending state and driving the control bus by the transmitting device with a signal pulse of a first value;
    when the transmitting device is in the pending state and the first value is detected on the control bus by the transmitting device when the signal pulse is not being driven by the transmitting device, transitioning the transmitting device to a discovered state, the discovered state indicating that the transmitting device has been discovered by a receiving device; and
    when the transmitting device is in the discovered state and a second value is detected on the control bus for a predetermined period of time by the transmitting device, transitioning the transmitting device to the pending state.

7. The method of claim 6, further comprising:
    when the transmitting device is in the discovered state or the pending state and a low value is detected on the power bus by the transmitting device, transitioning the transmitting device to the disconnect state.

8. The method of claim 6, further comprising transitioning the transmitting device to the disconnect state upon reset of the transmitting device.

9. The method of claim 6, wherein the transmitting device is to transfer multimedia data to the receiving device.

10. A transmitting device comprising:
    a transmitter to transmit signals to a receiving device;
    a cable interface to couple with the receiving device, the cable interface including:
        a single-wire, bi-directional control bus, and
        a power bus powered by the receiving device;
    logic to detect signals on the cable interface, the logic including:
        a first logic to detect a voltage value on the power bus, the transmitter to transition from a disconnect state to a pending state when a predetermined voltage is detected on the power bus by the first logic, the disconnect state indicating that the transmitting device is not connected to a receiving device, and
        a second logic to detect signals on the control bus, the transmitter to drive a first signal value on the control bus periodically upon transitioning to the pending state, the transmitter to transition to a discovered state when the first signal value is detected by the second logic when the transmitter is not driving the signal value on the control bus, the discovered state indicating that the transmitter has been discovered by the receiving device.

11. The transmitting device of claim 10, wherein the transmitting device is to transition to the disconnect state when the first logic determines that the voltage value on the power bus is lost.

12. The transmitting device of claim 10, further comprising a switchable pull up circuit on the control bus.

13. The transmitting device of claim 12, wherein the transmitting device is to enable the pull up circuit in the discovered state.

14. The transmitting device of claim 10, wherein the transmitting device is a mobile device.

15. The transmitting device of claim 10, wherein the receiving device is compatible with an interface that allows for the transfer of uncompressed digital high-definition video and audio, together with associated control signals.

16. A receiving device comprising:
   a receiver to receive signals from a transmitting device;
   an interface to be coupled with a transmitting device, the interface including a single-wire control bus and a power bus, the receiving device to enable a voltage potential of a predetermined value on the power bus and to drive a signal on the control bus at a first signal value in a disconnect state, the disconnect state indicating that the receiving device is not connected to a transmitting device; and
   a switchable pull down circuit on the control bus;
   logic to discover a transmitting device coupled with the receiving device, wherein the logic includes:
      a first logic to detect a first signal on the control bus, the receiving device to discover a first type of transmitting device and transition to a first state when the first signal is detected, the receiving device to enable the switchable pull down circuit on the control bus and disable hot plug functionality upon discovering the first type of transmitting device, and
      a second logic to detect a power signal from the receiving device, the receiving device to discover a second type of transmitting device and transition to a second state when the power signal is detected.

17. The receiving device of claim 16, wherein the receiving device is compatible with both the first type of transmitting device and the second type of transmitting device.

18. The receiving device of claim 16, wherein the second type of transmitting device is compatible with a standard protocol, and wherein the first type of device is compatible with a modified protocol.

19. The receiving device of claim 18, wherein the standard protocol provides an interface that allows for the transfer of uncompressed digital high-definition video and audio, together with associated control signals.

20. The receiving device of claim 16, wherein when the receiving device has discovered the first type of transmitting device, the receiving device is to transition to the disconnect state when the control bus remains low for a predetermined period.

21. The receiving device of claim 16, wherein when the receiving device has discovered the second type of transmitting device, the receiving device is to transition to the disconnect state when the power signal from the transmitting device is lost.

* * * * *